May 21, 1963 — E. A. DUDLEY — 3,090,138
VEGETATION HARVESTER
Filed Oct. 26, 1961 — 2 Sheets-Sheet 1

INVENTOR
E. A. DUDLEY

BY
ATTORNEY

May 21, 1963
E. A. DUDLEY
3,090,138
VEGETATION HARVESTER
Filed Oct. 26, 1961
2 Sheets-Sheet 2
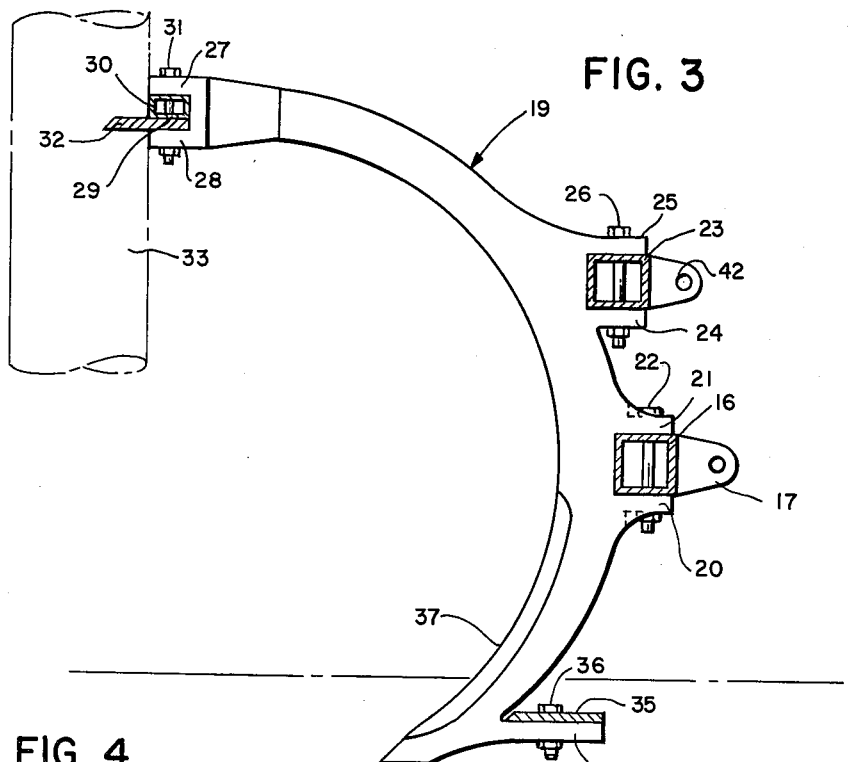
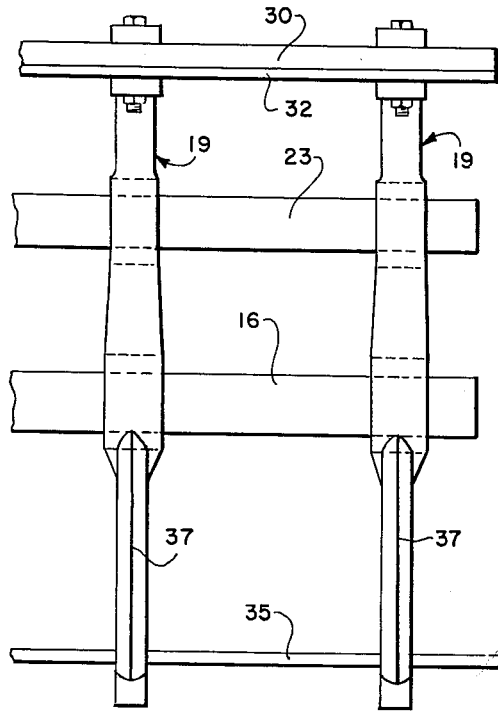
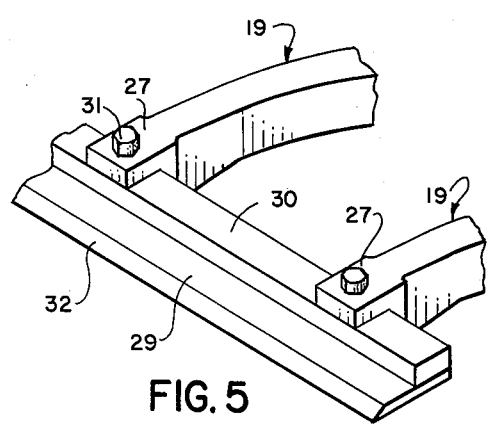
INVENTOR
E. A. DUDLEY
BY *Myles Dowell*
ATTORNEY

United States Patent Office 3,090,138
Patented May 21, 1963

3,090,138
VEGETATION HARVESTER
Earl Austin Dudley, P.O. Box 41, Angleton, Tex.
Filed Oct. 26, 1961, Ser. No. 147,789
7 Claims. (Cl. 37—2)

The present invention relates to vegetation harvesting and land clearing equipment and more particularly to a toothed blade mounted on a tractor for pushing over vegetation such as trees and cutting the roots of such trees and other vegetation thereby completely separating the trees and other vegetation from the earth.

Heretofore, the conventional bulldozer has been used to harvest vegetation and clear land and some blades have been made with teeth with a cutting blade mounted on the lower end of the teeth for severing roots of trees. With such prior construction it was necessary to have a separate tree pushing bar positioned above the bulldozer blade to engage the tree at a relatively high elevation so that the roots of the tree could be cut by the blade at the bottom of the teeth of the toothed bulldozer blade.

Although some of these prior art structures have been useful, it has been difficult to change from the tree clearing type blade to the conventional bulldozer road scraper type blade and consequently the cost of clearing land became great because of the delay in changing blades. Also, the initial cost of the prior equipment was unreasonably high, making it unavailable to many operators.

An object of the present invention is to provide harvesting and land clearing equipment which can be manufactured at relatively low cost and which can be readily applied to existing bulldozer type tractors with a minimum of delay and a minimum of structural changes in the attaching means.

A further object is to provide land clearing equipment in which a single blade unit serves to push a tree over at a sufficient angle to expose the roots so that the roots may be cut with a knife blade carried by the lower ends of the teeth.

Another object of the invention is to provide a toothed structure which can be readily manufactured and readily assembled to form a land clearing blade unit.

Figure 1:
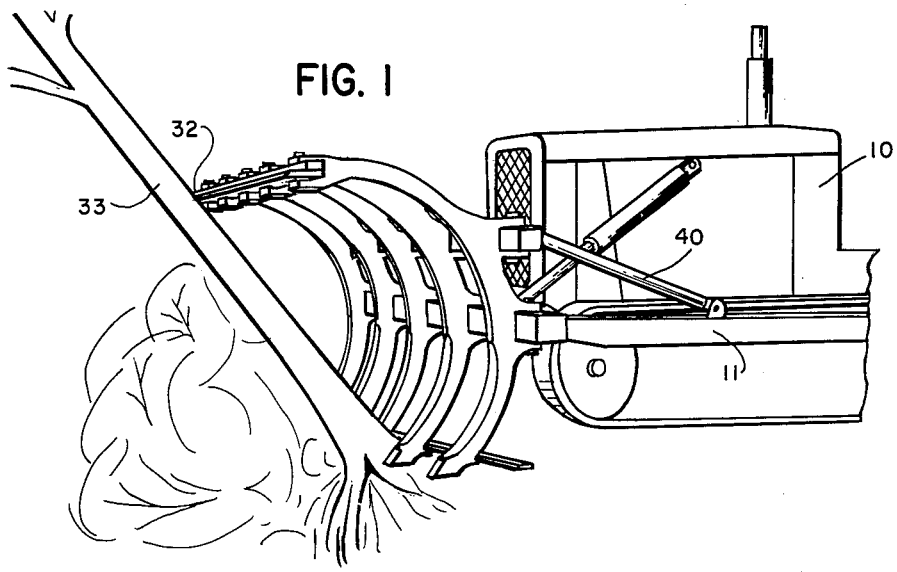
Figure 2:
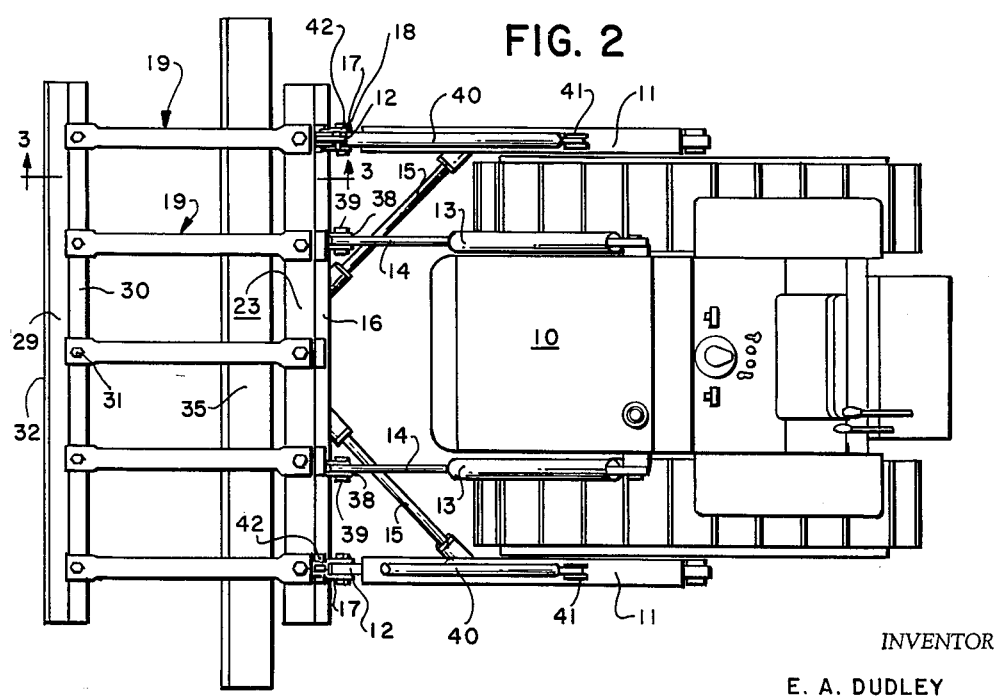

Other and further objects will be apparent as the description proceeds and upon reference to the accompanying drawings wherein:

FIG. 1 is a fragmentary perspective of the front portion of a caterpillar type tractor supporting the tree clearing blade unit on the conventional pusher bars of the tractor and showing the blade unit having its upper knife blade engaged with a tree trunk while the lower knife blade supported by the lower ends of the teeth of the same blade unit are severing the roots of trees which have become exposed;

FIG. 2, a plan view of the tractor with the tree clearing blade unit mounted thereon;

FIG. 3, a vertical section taken substantially on line 3—3 of FIG. 2, showing a single tooth in elevation with the upper and lower knife blades in section and the transverse tooth supporting bars in section with the mounting clevises on the supporting bars;

FIG. 4, a fragmentary front elevation of two teeth with the supporting bars and blades thereon; and FIG. 5, a fragmentary perspective showing the tree pushing blade and its strengthening box beam structure for limiting the extent of penetration of the tree pushing blade into a tree.

Briefly, the harvester of the present invention comprises a blade unit having a main bar mounted on the forward end of the usual pusher bars on a tractor with a plurality of teeth mounted on said main bar with the teeth spaced apart and being curved with the extremities of the teeth projecting forwardly from the tractor and the upper ends of the teeth extending a substantial distance forwardly beyond the lower ends of the teeth. A tree pusher knife type blade is mounted on the upper ends of the teeth by means of a box beam spaced rearwardly of the cutting edge so that the upper knife edge blade can engage a tree without cutting through the tree because of engagement of the box beam with the tree and as the tractor moves the blade unit forwardly a bottom cutting blade supported by the lower ends of the teeth severs the roots of the tree which have become exposed by the pushing action of the upper blade thereby completely severing the tree from the earth and cutting the roots sufficiently below the surface of the earth to prevent regrowth.

Referring more particularly to the drawings, a conventional caterpillar type tractor 10 is provided with the usual pusher arms 11 pivoted to the tractor rearwardly of the front end thereof with such pusher arms having tongue extensions 12 by means of which the blade unit is conventionally supported. The tractor is also provided with the conventional hydraulic cylinder and piston combination on each side in which the piston 14 terminates in a tongue having an aperture for receiving an attaching pin. Diagonal braces 15 extend from the pivoted arms 11 having their rear ends connected to such pivoted arms and their front ends arranged for detachable connection to a blade unit.

The blade unit of the present invention comprises a main supporting bar 16 of box section having a clevis 17 fixed thereto for receiving the tongue 12 of the pusher arm and being retained in place by a removable pin 18. A plurality of curved teeth 19 of generally C-shape and formed with rearwardly extending lugs 20, 21 engaging the upper and lower surfaces of the main bar 16 are secured to the main bar by such lugs being provided with aligned bolt receiving apertures registering with corresponding apertures in the main bar 16 and fastened by bolts 22 passing through such apertures. An auxiliary bar 23 of box shaped section is positioned above and forwardly of the main bar 16 and is received between lugs 24 and 25 of each tooth and secured to such lugs by bolts 26 passing through apertures in the lugs and registering apertures in the auxiliary bar 23.

The body of the tooth 19 extends upwardly and forwardly from the auxiliary bar 23 substantially beyond the lower end of the tooth and terminates in upper and lower lugs 27 and 28 which receive a knife type cutting blade 29 secured by welding or the like to a box section reinforcing beam 30 with the blade 29 and box section beam 30 snugly received between the lugs 27 and 28. The blade 29 and box beam 30 assembly is held in position by bolts 31 passing through registering apertures in the lugs and the blade box beam assembly, it being noted that the knife type cutting edge 32 projects substantially forwardly of the reinforcing beam section 30 so that the knife edge may extend into a tree 33 and be prevented from completely severing the tree by the reinforcing box section 30 having its front side engage the tree after limited penetration of the knife edge 32 into the tree.

Extending downwardly and forwardly from the main bar 16 the teeth terminate at their lower ends so that the lower or bottom ends are spaced substantially rearwardly of the upper ends of the teeth as shown in FIGS. 2 and 3. Extending rearwardly from the bottom end of each tooth is a shelf-like lug 34 which supports a knife type cutting blade 35 which is held in position on each tooth by bolts 36 passing through the blade and through the shelf-like lug 34.

The leading portions of the teeth 19 between the main bar 16 and approximately to the bottom ends of the teeth are tapered forwardly to a relatively sharp vertical edge 37 by the provision of bevels on each side of the sharp edge. It will also be noted that the teeth are formed to taper from the main bar 16 toward both the top and bottom ends with such taper being apparent from an inspection of FIGS. 3 and 4 whereby a uniformly strong tooth is obtained while reducing the resistance to passage through the earth to a minimum.

The blade unit is secured to the tongues 12 of pusher arms 11 by pins 18 received in clevises 17 on the main bar while the diagonal braces 15 are detachably secured to the main bar by any suitable means such as bolts or the like to provide sufficient rigidity so that pusher arms 11 may be pivoted upwardly or downwardly without striking the body of the tractor.

The tongue ends of the pistons 14 are received in clevises 38 on the main bar 16 and attached by removable pins 39 so the hydraulic cylinder piston rod combinations maintain the blade unit in operative position. To maintain the blade assembly against pivotal movement about pins 39 and 18, strut braces 40 are mounted between clevises 41 on arms 11 and cooperating clevises 42 on the auxiliary bar 23 thereby maintaining the blade unit in definite relation to the pusher arms 11. The hydraulic cylinder and piston combinations 13, 14 provide for raising and lowering the blade unit as required and also serve to maintain the blade unit at a definite elevation and/or with one end of the blade unit higher or lower than the other end of the blade unit to accommodate for irregular surfaces.

From the above description it is believed that the utility of the invention should be apparent. The blade unit is readily mounted on an existing tractor by the removable connection at the front end of the diagonal braces 15, struts 40, arms 11 and piston-cylinder combinations 13, 14 so that the blade unit may be readily substituted for any other type blade used with the tractor.

Also, in use it will be apparent that the lower root cutting blade 35 is normally held below the surface while the upper blade 32 engages a tree at a substantial elevation with such vertical height of the blade being in the order of 67 inches so that the tree is engaged sufficiently high to obtain substantial leverage causing the tree to pivot, raising the roots on the side of the tree adjacent the tractor so that such roots are cut by the cutter 32 thereby completely severing the tree from the earth by the cutting action through such roots. The cutting action is readily accomplished with a limited force because the point of cutting the roots is at a low point where the diameter of the roots is small due to the action of raising the roots by the pushing of the tree by means of the upper blade 32. The vegetation of less height than the height of the upper cutting and pushing blade 32 is cut by the knife action of blade 32 whereby the complete clearing of the land is accomplished by a single pass of the tractor equipped with the land clearing blade unit of the present invention.

In normal operation the lower blade 35 is approximately 4 inches above the bottom ends of the teeth 19 and is set to approximately 5 inches below the surface of the earth.

What is claimed is:

1. A harvester comprising a tractor, an arm at each side of the tractor and pivoted to the tractor rearwardly of the front end of the tractor, a support bar fixedly mounted on the forward ends of said pivoted arms, a hydraulic cylinder and piston means on each side of said tractor engaging said support bar for raising and lowering the support bar and maintaining the support bar in fixed relation with respect to the tractor, diagonal braces between said arms and said support bar for maintaining said support bar in operative position preventing the arms contacting the tractor, a plurality of teeth of generally curved shape mounted on said support bar and lying in planes extending longitudinally of the tractor, said teeth having their lower ends projecting forwardly from the support bar a short distance and having their upper ends projecting forwardly of said support bar a substantially greater distance, a lower cutting blade mounted on the lower ends of the teeth with the teeth projecting forwardly of the lower cutting blade, an upper pushing blade projecting forwardly of the upper ends of the teeth and mounted on the upper ends of the teeth whereby in use the blade at the upper end first engages trees and thereafter the lower blade engages the lower portions of the trees, the trees being tilted away from the tractor by the upper blade exposing the tree roots which are cut by the lower blade thereby completely severing the trees from the earth, the earth passing between the teeth and the vegetation being pushed forwardly by the teeth thereby completely denuding the earth of upwardly exposed vegetation and trees and killing the growth by cutting the roots at points normally below the surface of the earth.

2. A blade unit for completely denuding land from vegetation comprising a pair of supporting bars, a plurality of C-shaped teeth mounted on said bars and projecting laterally therefrom, with one end extending substantially beyond the other end of each tooth, a tree engaging blade mounted on the ends of the teeth and projecting outwardly beyond the said ends of such teeth, a cutting blade mounted on the other ends of the teeth and spaced rearwardly of the leading edge of the corresponding teeth, said cutting blade being substantially forwardly of said supporting bars and the supporting bar adjacent the cutting blade being substantially spaced from the cutting blade whereby when the blade unit is mounted on a tractor with the tree engaging blade uppermost such tree engaging blade will engage tall vegetation causing such tall vegetation to assume an inclined position relative to the earth exposing the roots adjacent the cutting blade so that such roots are severed at a location on the roots substantially below the surface of the earth thereby removing the vegetation.

3. A vegetation harvester for completely clearing land in a single forward pass comprising a tractor having pivoted pusher arms on the sides thereof, a toothed blade unit mounted on the forward ends of said pusher arms, said blade unit having a plurality of substantially C-shaped teeth of approximately half a circle with each tooth lying in a vertical plane extending in the direction of movement of the tractor, a tree engaging pusher blade mounted on the upper ends of the teeth and located substantially ahead of the bottom ends of the teeth, the lower ends of the teeth being spaced rearwardly of the upper ends of the teeth by substantially two-thirds of the radius of curvature of said teeth, a cutting blade on the lower ends of the teeth whereby the blade unit engages tall vegetation with the pusher blade at the upper end and thereafter the roots are engaged by the lower ends of the teeth and the cutting blade at the lower ends of the teeth completely severing the vegetation from the earth.

4. A tooth structure for land clearing equipment comprising a body of generally half-circular shape, two pairs of lugs projecting outwardly from the convex edge of said tooth for receiving supporting bars, one end of said tooth being provided with mounting lugs for receiving a pushing blade unit, the other end of the tooth being provided with a shelf projecting outwardly from the convex edge for receiving a cutting blade, said lugs being arranged so that in normal operation the first end of the tooth projects substantially beyond the second end of the tooth.

5. The invention according to claim 4 in which the tooth structure tapers from the lugs toward each end to provide substantially uniform strength.

6. The invention according to claim 5 in which the concave portion of the tooth between said shelf lug and said supporting bar lugs tapers toward said concave edge.

7. A land clearing blade unit for direct attachment to the pushing arms of a tractor comprising a main supporting bar for mounting on the pusher arms of a tractor, a plurality of curved teeth disposed in transverse relation to said main bar and mounted on said main bar, each tooth projecting away from said bar in one direction a substantial distance and projecting in the other direction an appreciably less distance whereby the ends of the teeth projecting in one direction extend substantially beyond the other ends of the teeth, a pushing knife-type blade mounted on the ends of the teeth which project beyond the other ends thereof, a cutting blade mounted on the other ends of said teeth and projecting beyond the end tooth an appreciable distance beyond the ends of the pushing blade whereby spreading roots will be effectively cut by said cutting blade.

References Cited in the file of this patent

UNITED STATES PATENTS

| | | |
|---|---|---|
| 2,173,406 | Wilkinson | Sept. 19, 1939 |
| 2,295,458 | Edwards | Sept. 8, 1942 |
| 2,625,870 | Peacock et al. | Jan. 20, 1953 |
| 2,716,823 | Mullin | Sept. 6, 1955 |
| 2,860,426 | Allin et al. | Nov. 18, 1958 |
| 2,950,551 | Pesce | Aug. 30, 1960 |